United States Patent
Zhang et al.

(10) Patent No.: US 8,355,823 B2
(45) Date of Patent: Jan. 15, 2013

(54) METHOD AND SYSTEM FOR CONTROLLING OPERATION OF A WIND TURBINE

(75) Inventors: Tie Ling Zhang, Singapore (SG); Yu Zhou, Singapore (SG); Khoon Peng Lim, Singapore (SG); Bung Chai Chin, Singapore (SG); Pey Yen Siew, Singapore (SG); Jiann Yi Ho, Singapore (SG); Wan Ying Chen, Singapore (SG); Jiun Keat Ong, Singapore (SG); Kiran Kishan Rao Nandedkar, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 266 days.

(21) Appl. No.: 12/773,441

(22) Filed: May 4, 2010

(65) Prior Publication Data

US 2010/0298995 A1 Nov. 25, 2010

Related U.S. Application Data

(60) Provisional application No. 61/181,082, filed on May 26, 2009.

(30) Foreign Application Priority Data

May 25, 2009 (DK) .......................... PA 2009 70011

(51) Int. Cl.
| | |
|---|---|
| *G05D 3/12* | (2006.01) |
| *G05D 5/00* | (2006.01) |
| *G05D 9/00* | (2006.01) |
| *G05B 13/02* | (2006.01) |
| *G06F 19/00* | (2006.01) |
| *F03D 9/00* | (2006.01) |
| *H02P 9/04* | (2006.01) |

(52) U.S. Cl. ........................................................ 700/286
(58) Field of Classification Search .................. 700/286, 700/287, 288; 290/44, 55; 702/34, 182, 702/183, 184, 185, 188
See application file for complete search history.

(56) References Cited

U.S. PATENT DOCUMENTS 6,925,385 B2 * 8/2005 Ghosh et al. .................... 702/14
(Continued)

FOREIGN PATENT DOCUMENTS

EP 2048562 A1 4/2009
(Continued)

OTHER PUBLICATIONS

U.S. Appl. No. 61/122,062, filed Dec. 2008, Lim et al.*
(Continued)

*Primary Examiner* — Ronald Hartman, Jr.
(74) *Attorney, Agent, or Firm* — Wood, Herron & Evans, LLP

(57) ABSTRACT

Methods and systems for controlling operation of a wind turbine. The method may comprise determining an alarm level for at least one component of the wind turbine. In the case that an alarm level for at least one component exceeds a predefined level, the method comprises estimating an expected remaining lifetime for the component under the current operating conditions, and controlling operation of the wind turbine in order to adjust the expected remaining lifetime for the component to a desired expected remaining lifetime for said component. Thereby, the expected remaining lifetime for the component can be prolonged until the next scheduled service event. Downtime of the wind turbine is considerably reduced, and unscheduled service events are avoided to the greatest possible extent. Mean time between inspections (MTBI) is also extended.

17 Claims, 10 Drawing Sheets

U.S. PATENT DOCUMENTS

| | | | |
|---|---|---|---|
| 7,013,203 B2 * | 3/2006 | Moore et al. | 700/286 |
| 7,127,373 B2 * | 10/2006 | House et al. | 702/182 |
| 7,677,869 B2 * | 3/2010 | Martinez De Lizarduy Romo et al. | 416/37 |
| 7,822,560 B2 * | 10/2010 | LeMieux | 702/34 |
| 7,895,016 B2 * | 2/2011 | Vittal et al. | 702/184 |
| 7,933,744 B2 * | 4/2011 | Jammu et al. | 702/185 |
| 7,945,351 B2 * | 5/2011 | Lim et al. | 700/287 |
| 8,082,115 B2 * | 12/2011 | Bechhoefer et al. | 702/34 |
| 2007/0140847 A1 | 6/2007 | Martinez De Lizarduy Romo et al. | |
| 2008/0112807 A1 | 5/2008 | Uphues et al. | |
| 2008/0140349 A1 * | 6/2008 | Behera et al. | 702/182 |
| 2010/0148507 A1 * | 6/2010 | Lim et al. | 290/44 |
| 2010/0332272 A1 * | 12/2010 | Ong et al. | 705/7 |
| 2011/0106510 A1 * | 5/2011 | Poon | 703/2 |
| 2011/0125419 A1 * | 5/2011 | Bechhoefer et al. | 702/34 |
| 2011/0313726 A1 * | 12/2011 | Parthasarathy et al. | 702/179 |
| 2012/0029839 A1 * | 2/2012 | Ritter et al. | 702/34 |

FOREIGN PATENT DOCUMENTS

| | | | |
|---|---|---|---|
| WO | 0166940 A1 | | 9/2001 |
| WO | WO2009/133161 | * | 5/2009 |

OTHER PUBLICATIONS

Giebhardt, et al, "Requirements for Condition Based Operation and Maintenance in Offshore Wind Farms", Presentation at the European Offshore Wind Conference and Exhibition, Berlin, Germany, Dec. 4-6, 2007, 7 pages.

McMillan et al, "Toward Quantification of Condition Monitoring Benefit for Wind Turbine Generators", Renewable Power Generation, IET, Mar. 2008, vol. 2 Issue: 1, 11 pages.

Denmark Patent and Trademark Office, Office Action issued in related Denmark Patent Application No. PA 2009 70011.

* cited by examiner

METHOD AND SYSTEM FOR CONTROLLING OPERATION OF A WIND TURBINE

CROSS-REFERENCE TO RELATED APPLICATIONS

This application claims priority under 35 U.S.C. §119(a) to DK Application No. PA 2009 70011, filed May 25, 2009. This application also claims the benefit of U.S. Provisional Application No. 61/181,082, filed May 26, 2009. The disclosure of each of these applications is incorporated by reference herein in its entirety.

FIELD OF THE INVENTION

The present invention relates to a method for controlling operation of a wind turbine, and to a system for performing the method. More particularly, the method of the present invention minimizes downtime of a wind turbine due to breakdown of components and required unscheduled service events.

BACKGROUND OF THE INVENTION

When controlling operation of a wind turbine, a number of parameters relating to the wind turbine are normally measured. Some of these parameters may relate to the health of one or more components of the wind turbine, such as a gear system, part of a gear system, a bearing, a generator, a drive shaft, etc. These parameters may include a temperature of the component or measured in the vicinity of the component, load, stress or strain of a component, etc. Measuring and analysing such parameters allows an operator to detect when a component reaches a state where it is expected to break down. When this happens, a service inspection must be scheduled in order to repair or replace the component. This results in undesired service events which are additional to the normal service schedule. Furthermore, in the case that the component breaks down before the service inspection can take place, the wind turbine must be stopped for a period of time. This has the consequence that the power production of the wind turbine is decreased.

DESCRIPTION OF THE INVENTION

It is an object of embodiments of the invention to provide a method for controlling the operation of a wind turbine, wherein the number of unscheduled service inspections is reduced as compared to prior art methods.

It is a further object of embodiments of the invention to provide a method for controlling the operation of a wind turbine, wherein the total downtime of the wind turbine is reduced as compared to prior art methods.

It is an even further object of embodiments of the invention to provide a system for controlling the operation of a wind turbine, wherein the number of unscheduled service inspections is reduced as compared to prior art control systems.

It is an even further object of embodiments of the invention to provide a system for controlling the operation of a wind turbine, wherein the total downtime of the wind turbine is reduced as compared to prior art control systems.

According to a first embodiment, the invention provides a method of controlling the operation of a wind turbine. The method comprises determining an alarm level for at least one component of the wind turbine. In the case that an alarm level for at least one component exceeds a predefined level, an expected remaining lifetime is estimated for the component under the current operating conditions, and the operation of the wind turbine is controlled in order to adjust the expected remaining lifetime for the component to a desired expected remaining lifetime for the component.

In the present context, the term 'wind turbine' should be interpreted to mean a structure being adapted to extract energy from the wind and convert it into electrical energy. Modern wind turbines normally comprise a tower construction rotatably supporting a nacelle. The nacelle carries a hub having a set of rotor blades attached thereto. The rotor blades can be directed towards the wind by rotating the nacelle relative to the tower construction. The interior part of the nacelle contains energy converting equipment, e.g., a drive train including a gear arrangement and a generator, the generator being electrically connected to a power grid. As an alternative, the wind turbine may be of a gearless kind.

The method may comprise determining an alarm level for at least one component of the wind turbine. Suitable components include, but are not limited to, gear arrangement, gear parts, including drive shafts or gear wheels, bearings or generator. In the present context, the term 'determining an alarm level' should be interpreted to mean determining the present status of a given component in terms of operability. Thus, a low alarm level for a given component indicates that the component is fully operational, and the higher the alarm level, the higher the risk that the component may break down in the near future. Accordingly, a determined alarm level for a given component provides information regarding the risk of that component breaking down. Furthermore, the alarm level may depend on the severity of a possible malfunction or fault of a component.

In the case that an alarm level for at least one component exceeds a predefined level, an expected remaining lifetime for the component under the current operating conditions is estimated. The predefined level may advantageously be a level which indicates that service will be required for the component. In the present context, the term 'expected remaining lifetime' should be interpreted to mean the time which in average will lapse before the component breaks down, if the wind turbine is continuously operated under the current operating conditions, e.g., in terms of output power level.

Subsequently, the operation of the wind turbine is controlled in order to adjust the expected remaining lifetime for the component to a desired expected remaining lifetime. This may, e.g., include prolonging the expected remaining lifetime sufficiently to allow the wind turbine to continue operating until the next scheduled service event. Therefore, downtime as well as unscheduled service events is avoided. Alternatively or additionally, the expected remaining lifetime may be prolonged to reach a time period where it is more convenient to perform service or maintenance on the wind turbine. Such time periods may, e.g., include low wind periods or periods with improved weather conditions. This is in particular relevance for offshore wind turbines where favorable weather conditions are crucial for gaining access to the turbine. As another alternative, in the case that it is not possible to prolong the expected remaining lifetime to the next scheduled service event or to a more convenient time period, an additional service event can be scheduled within the time span which the expected remaining lifetime can be prolonged to. In any event, it can be ensured that the total power output of the wind turbine is maximised in the period until the required service is performed. Furthermore, the mean time between inspections (MTBI) can be extended in this manner.

The an alarm level for at least one component of the wind turbine may be determined by obtaining data relating to health status for one or more components of the wind turbine, and determining an alarm level for at least one of the component(s), based on the obtained data.

In the present context, the term 'health status' should be interpreted to mean a status being indicative of whether or not and to what extent the component is operational. Thus, the health status for a component may indicate whether the component is likely to break down in the near future, and/or whether a malfunction and/or an error is likely to occur. The health status may also indicate whether the present operating settings are suitable for the component. Data relating to the health status of a component may include, but is not limited to, the temperature of the component or in the vicinity of the component, vibrations of the component, stress of the component, strain of the component and/or loads of the component.

According to this embodiment, an alarm level for at least one of the component(s) is determined based on the obtained data. Thus, the health status of a component determines the alarm level. Accordingly, if the obtained data reveals that a given component has a good health status, then the alarm level for this component is determined as low. On the other hand, if the obtained data reveals that the health status for a given component is relatively poor, e.g., indicating that the component is likely to break down in the near future, and/or that the current operating settings are not suitable for the component, e.g., due to vibrations being induced in the component, then the alarm level is determined as high.

The data relating to health status for one or more components may be obtained by measuring one or more parameters of each component by means of one or more sensors. According to this embodiment, the data relating to health status for the component(s) is obtained directly by measurements. Examples of suitable sensors include, but are not limited to, temperature sensors, vibration sensors, strain sensors, and stress sensors. As an alternative to measuring parameters, data relating to health status for one or more components may be obtained in an indirect manner.

The expected remaining lifetime for the component may be estimated on the basis of empirically obtained data. The empirically obtained data may comprise data relating to wind speed and/or wind direction at the site of the wind turbine. Such data may have been obtained during a period preceding the erection of the wind turbine, and/or during operation of the wind turbine. The empirically obtained wind data may be statistically processed. Thereby, information regarding, e.g., wind speed distribution at the site of the wind turbine may be obtained, e.g., in the form of average wind speed for each month, possibly supplemented by information regarding the standard deviation of the wind speed data. The wind speed may vary during the year, i.e. higher wind speeds may be likely to occur during the winter season than during the summer season. Statistically processed empirical data as described above may be used for estimating the expected wind speed at the site of the wind turbine within the next one or more months. This may be an important factor when determining how to control operation of the wind turbine in order to adjust the expected remaining lifetime to a desired expected remaining lifetime. For instance, during low wind periods it is more likely that it is possible to operate the wind turbine at maximum output power without risking breakdown of a component with a given alarm level, than it is during high wind periods.

Alternatively or additionally, the empirically obtained data may comprise data relating to lifetimes of components identical or similar to the component. Such data may, e.g., be obtained in the following manner. When a given alarm level is detected for a given component, that component is monitored and the power output as a function of time, as well as the time lapsing between the alarm level was detected until the component broke down is logged. This is done for a large number of identical or similar components, and thereby statistical information about expected remaining lifetime for a component under various operating conditions is obtained. This information may advantageously be used for estimating or calculating the expected remaining lifetime for a component when a given alarm level is detected, and under given operating conditions.

As an example, the empirically obtained data relating to lifetimes of identical or similar components may be processed using the following formula:

$$\tau_{alarmlevel} = \alpha_5 \tau_5 + \alpha_4 \tau_4 + \alpha_3 \tau_3 + \alpha_2 \tau_2 + \alpha_1 \tau_1,$$

wherein $\tau_{alarmlevel}$ is the measured remaining lifetime of a component after a given alarm level has been detected, $\tau_i$ is the time which the component was operated at power output class i, and $\alpha_i$ is a coefficient connected to the power output class i. For each alarm level, the values of the $\alpha_i$'s may be determined from measurements originating from a large number of components, e.g., by means of curve fitting and/or regression methods.

Once the $\alpha_i$'s have been determined, the expected remaining lifetime of a component after a given alarm level has been detected may be calculated using the following formula:

$$t_{alarmlevel} = \alpha_5 T_5 + \alpha_4 T_4 + \alpha_3 T_3 + \alpha_2 T_2 + \alpha_1 T_1,$$

where the $a_i$'s are the coefficients which have previously been determined as described above, $T_i$ is the time which the component is operated at power output class i, and $T_{alarmlevel}$ is the calculated remaining lifetime of the component after a given alarm level has been detected. The expected remaining lifetime of the component may be adjusted by adjusting the $T_i$'s to obtain a desired expected remaining lifetime for the component.

As an alternative, the empirical data may be plotted, and these curves may be used when the expected remaining lifetime is to be calculated for a given component, e.g., in the manner described below with reference to FIG. 2.

According to an embodiment of the invention, the wind turbine may be controlled by reducing the power production of the wind turbine in order to extend the expected remaining lifetime of the component to a coming scheduled maintenance of the wind turbine.

Alternatively or additionally, operation of the wind turbine may be controlled by estimating an expected wind speed at the site of the wind turbine during the estimated expected remaining lifetime of the component. In the case that the estimated expected wind speed is below a predefined threshold value, the operation of the wind turbine is controlled to maintain an output power level of the wind turbine. In the case that the estimated expected wind speed is above the predefined threshold value, the operation of the wind turbine is controlled to reduce the output power level of the wind turbine.

The predefined threshold value of the wind speed may advantageously be selected in such a manner that wind speeds below the predefined threshold value does not result in excessive loads on or damage to the component if the wind turbine is operated in order to obtain maximum output power. Thus, in this case the operation of the wind turbine can be controlled in accordance with the control strategy which would have been selected if it had been determined that the component was healthy and fully operational, e.g., a maximum power output control strategy. Accordingly, in this case the output power level is maintained at the maximum possible level, i.e., the nominal power provided that the wind speed is sufficiently high to allow the nominal power to be reached.

On the other hand, in the case that the estimated wind speed is expected to exceed the predefined threshold value, controlling the operation of the wind turbine in accordance with a 'maximum power output' control strategy may have an adverse effect on the expected remaining lifetime of the component. Accordingly, in order to prolong the expected remaining lifetime of the component, the output power level of the wind turbine is reduced, i.e., the wind turbine is derated.

The expected wind speed may be estimated on the basis of empirically obtained wind data. The empirically obtained wind data may be statistically processed as described above, thereby obtaining information regarding average wind speed and possible standard deviation of wind speed month by month. Such information may advantageously be used for estimating the expected wind speed within the next one or more months.

The method may further comprise scheduling maintenance of the wind turbine in the case that the alarm level for the component remains above the predefined level after the output power level of the wind turbine has been reduced. According to this embodiment, in the case that it turns out that derating the wind turbine is not sufficient to prolong the expected remaining lifetime of the component to a desired expected remaining lifetime, e.g., until the next scheduled service event or until a period with more favourable weather conditions, an extra service event is scheduled in order to repair or replace the component. However, it is still possible to schedule the service event and to keep the wind turbine running until the service event can take place.

According to a second embodiment, the invention provides a system for controlling operation of a wind turbine. The system may comprise an alarm unit adapted to determine an alarm level for at least one component of the wind turbine, a lifetime calculator adapted to determine an expected remaining lifetime for the component, and a control unit adapted to control the operation of the wind turbine in response to a determined expected remaining lifetime.

It should be noted that a person skilled in the art would readily recognize that any feature described in combination with the first embodiment of the invention could also be combined with the second embodiment of the invention, and vice versa.

The control system of the second embodiment of the invention may advantageously be adapted to perform the method of the first aspect of the invention.

The alarm unit may comprise a data collecting unit for obtaining data relating to health status for one or more components of the wind turbine. The data collecting unit may comprise one or more sensors arranged at or in the vicinity of the component(s). As mentioned above, such sensors may, e.g., be in the form of temperature sensors, vibration sensors, load sensors, etc.

The lifetime calculator may advantageously be adapted to calculate the expected remaining lifetime of the component in a manner described above with reference to the first embodiment of the invention.

The control unit may be adapted to reduce the output power level of the wind turbine, i.e., to derate the wind turbine. As mentioned above, this may be advantageous in order to prolong the expected remaining lifetime of a component, e.g., until the next scheduled service event.

The invention further relates to a wind turbine comprising a system according to the second embodiment of the invention.

BRIEF DESCRIPTION OF THE DRAWINGS

The invention will now be described in further detail with reference to the accompanying drawings.

DETAILED DESCRIPTION OF THE DRAWINGS

Figure 1C:
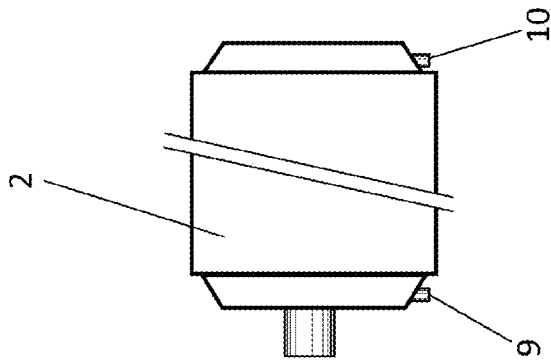
FIGS. 1a-1c illustrates sensors arranged on a gear box and a generator.
Figure 1B:
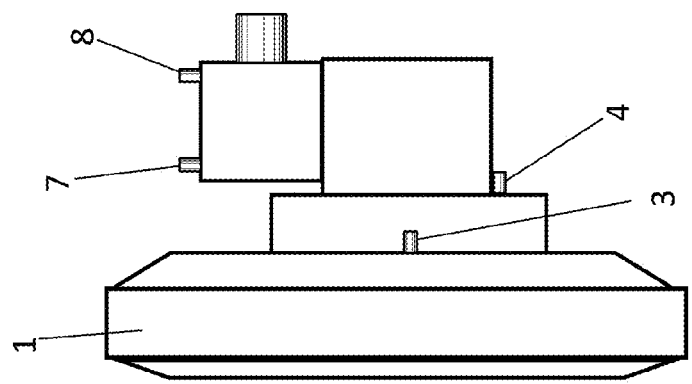
Figure 1A:
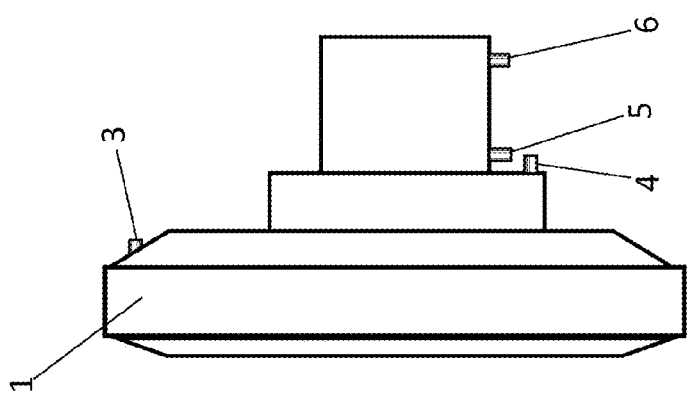

FIG. 1a is a side view of a gear box 1 for a wind turbine, FIG. 1b is a top view of the gear box 1 of FIG. 1a, and FIG. 1c is a side view of a generator 2 for the wind turbine. The gear box 1 and the generator 2 are provided with a total of eight accelerometers 3-10, arranged at various positions of the gear box 1 and the generator 2. The accelerometers 3-10 are used for detecting vibrations in the gear box 1 or the generator 2, respectively, at their respective positions. The result of the measurements performed by the sensors 3-10 is analyzed in a condition monitoring system (CMS), and based on the analysis a health state for the gear box 1 and a health state for the generator 2 are derived. Thus, if one or more of the sensors 3-8 arranged on the gear box 1 present an elevated vibration level, this is an indication that the gear box 1 is in a non-optimal health state. The CMS then triggers a corresponding alarm level for the gear box 1. Similarly, if one or both of the sensors 9, 10 arranged on the generator 2 measure an elevated vibration level, it is concluded that the generator 2 is in non-optimal health state, and a corresponding alarm level is triggered for the generator 2.

The gear box 1 and/or the generator 2 may alternatively or additionally be provided with other kinds of sensors, such as temperature sensors, which can be used for measuring a parameter being indicative of the health status of the component. Furthermore, the gear box 1 and/or the generator 2 may be provided with any number of sensors in alternative embodiments.

Figure 2:
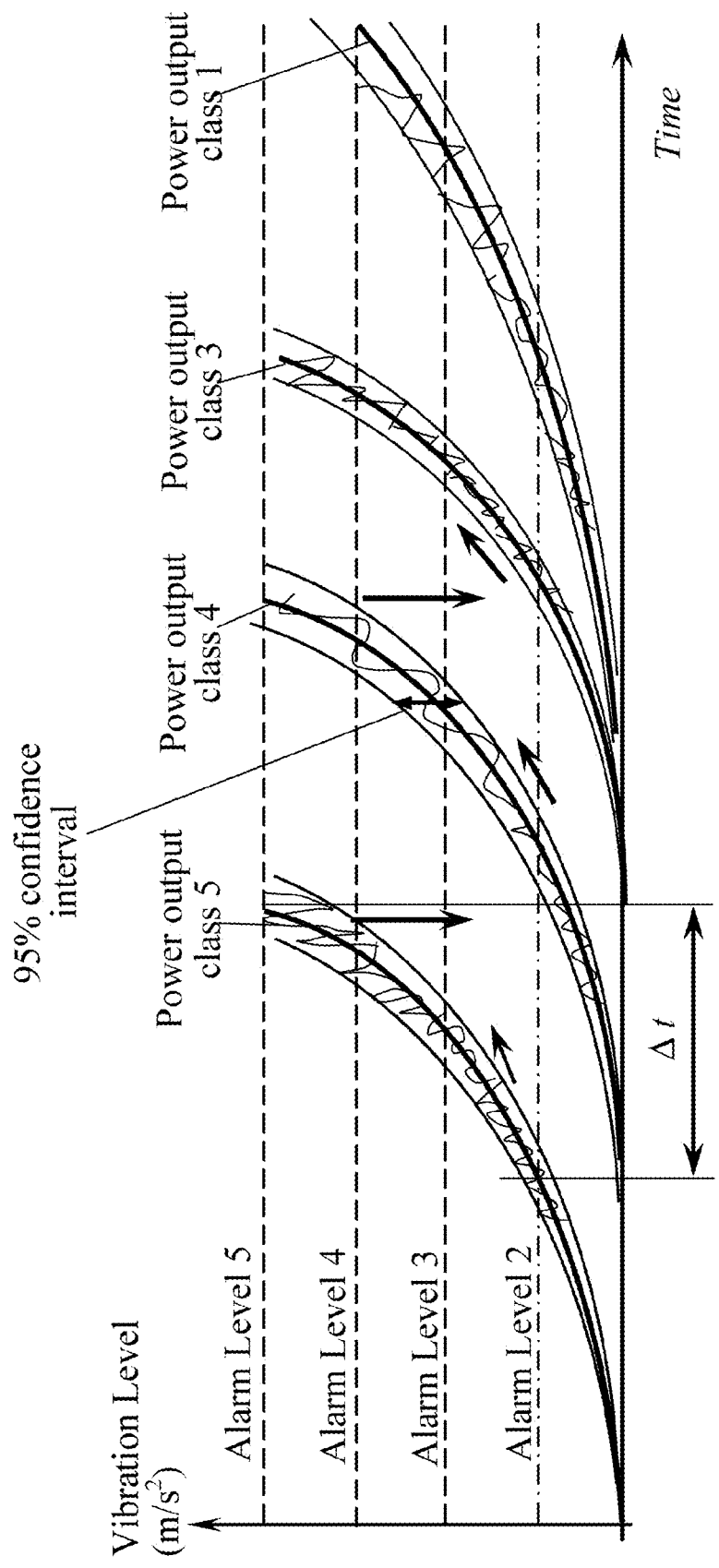
FIG. 2 illustrates the expected remaining lifetime of a component at various alarm levels and for various control strategies.

FIG. 2 is a graph illustrating the expected remaining lifetime of a component after a given alarm level is detected and for various control strategies. The component may, e.g., be the gear box 1 of FIGS. 1a and 1b or the generator 2 of FIG. 1c. In the graph, the vibration level of the component is plotted against time. Four vibration levels corresponding to four alarm levels, alarm level 2-5, are marked. Thus, when the vibration level for the component reaches the level marked 'alarm level 2', alarm level 2 is triggered for the component. Alarm level 5 is the most severe level, and when this level is reached, the component is very likely to break down, and operation of the wind turbine has to be stopped.

The curve labelled 'Power output class 5 ' illustrates the vibration level as a function of time in the case that the wind turbine is operated in power output class 5. The average vibration level as well as the 95% confidence interval band is plotted. When the vibration level corresponding to alarm level 2 is reached, the expected remaining lifetime is the time elapsing from the alarm level 2 is detected until the alarm level 5 is reached, and the component is most likely to break down. This time interval is marked as Δt.

In the graph, corresponding curves are plotted illustrating the situations where the wind turbine is operated in power output classes 4, 3 and 1, respectively. It is clear from the graph, that the expected remaining lifetime is increased when the wind turbine is operated in a lower power output class.

It should be noted that in the present context, the term 'power output class' should be interpreted to mean an output power interval for the wind turbine. For a specific wind turbine with a given nominal output power, the power levels are divided into suitable intervals, and the highest power class corresponds to nominal power or almost nominal power. For instance, for a 2.0 MW platform, the power classification may be as follows:

|  | Power output class | | | | |
| --- | --- | --- | --- | --- | --- |
|  | 1 | 2 | 3 | 4 | 5 |
| Power value $P_w$ (MW) | $P_w \leq 0.7$ | $0.7 < P_w \leq 1.2$ | $1.2 < P_w \leq 1.5$ | $1.5 < P_w \leq 1.8$ | $1.8 < P_w$ |

As another example, the power classification for a 3.0 MW platform may be as follows:

|  | Power output class | | | | |
| --- | --- | --- | --- | --- | --- |
|  | 1 | 2 | 3 | 4 | 5 |
| Power value $P_w$ (MW) | $P_w \leq 0.9$ | $0.9 < P_w \leq 1.5$ | $1.5 < P_w \leq 2.1$ | $2.1 < P_w \leq 2.65$ | $2.65 < P_w$ |

The curves shown in FIG. 2 may be obtained from measurements obtained from a large number of identical or similar components. Many curves which represent the vibration level versus the running time after a given alarm level is triggered may be plotted. One curve, e.g., means the turbine may run more than 80% of the remaining useful lifetime under power output class 5. Or, another curve, e.g., means the turbine may run over 80% of the remaining useful lifetime with power output class 4, etc. From all those reference curves, it turns out that the turbine may run with different control schemes by adjusting the time in which the component is operated at the various power output classes after the given alarm level has been detected.

Figure 3:
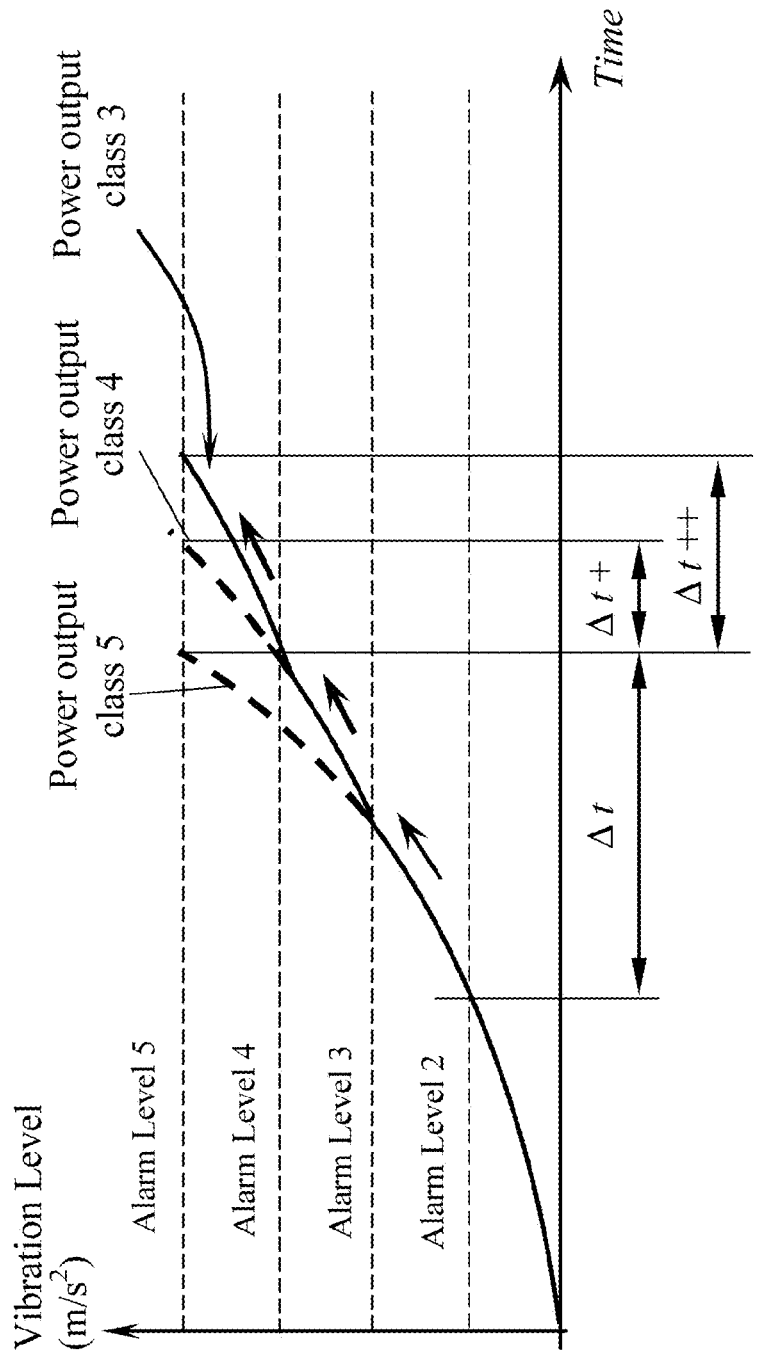
FIG. 3 illustrates the expected remaining lifetime of a component under an alternative control strategy.

FIG. 3 is a graph illustrating the expected remaining lifetime of a component under a control strategy according to an alternative embodiment. According to this control strategy, when the vibration level corresponding to alarm level 2 is reached, the expected remaining useful lifetime is Δt if the wind turbine is operated in power output class 5 for more than 80% of the remaining lifetime. This is illustrated by the curve 'Power output class 5'.

If it turns out that Δt is shorter than the time until the next scheduled service event, then the wind turbine may be derated to be operated in power output class 4 for more than 80% of the remaining lifetime when the vibration level corresponding to alarm level 3 is reached. This is illustrated by the curve 'Power output class 4 '. Thereby, the expected remaining lifetime is extended by Δt+ as compared to the situation where the wind turbine is operated in power output class 5.

If it turns out, that the extended expected remaining lifetime, (Δt)±(Δt+), is also shorter than the time until the next scheduled service event, then the wind turbine may be even further derated to be operated in power class 3 for more than 80% of the remaining lifetime when the vibration level corresponding to alarm level 4 is reached. This is illustrated by the curve 'Power output class 3 '. Thereby the expected remaining lifetime is extended even further by Δt++ as compared to the situation where the wind turbine is operated in power class 5. If this is still insufficient to obtain a desired expected remaining lifetime, then either further derating may be considered, or an extra service event may be scheduled in order to repair or replace the component.

Figure 4A:
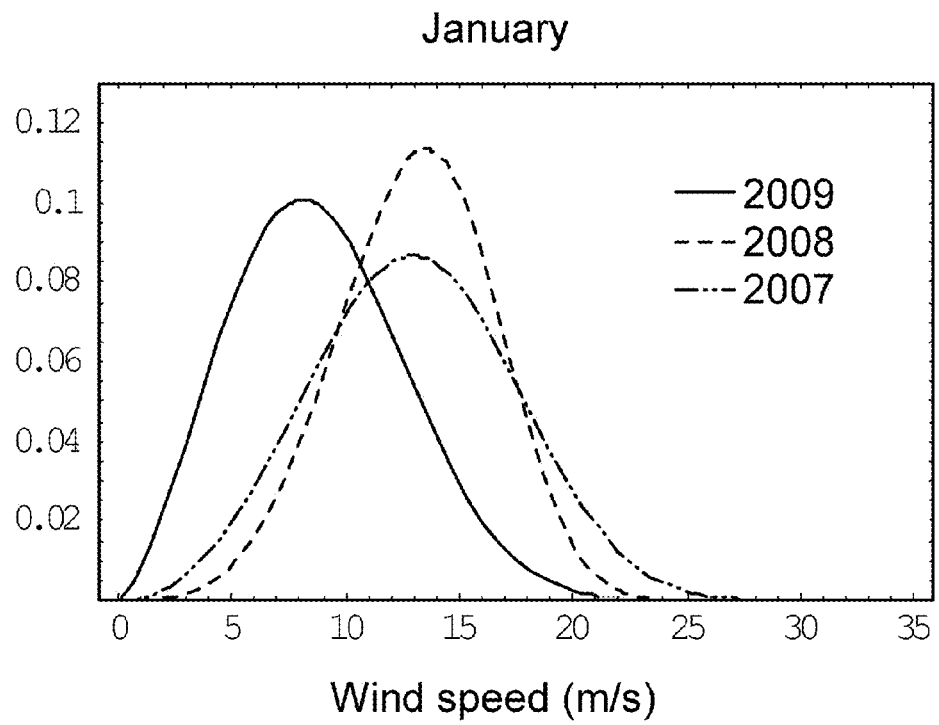
FIGS. 4a and 4b show wind distribution curves for a specific site during January and February, respectively, for three subsequent years.
Figure 4B:
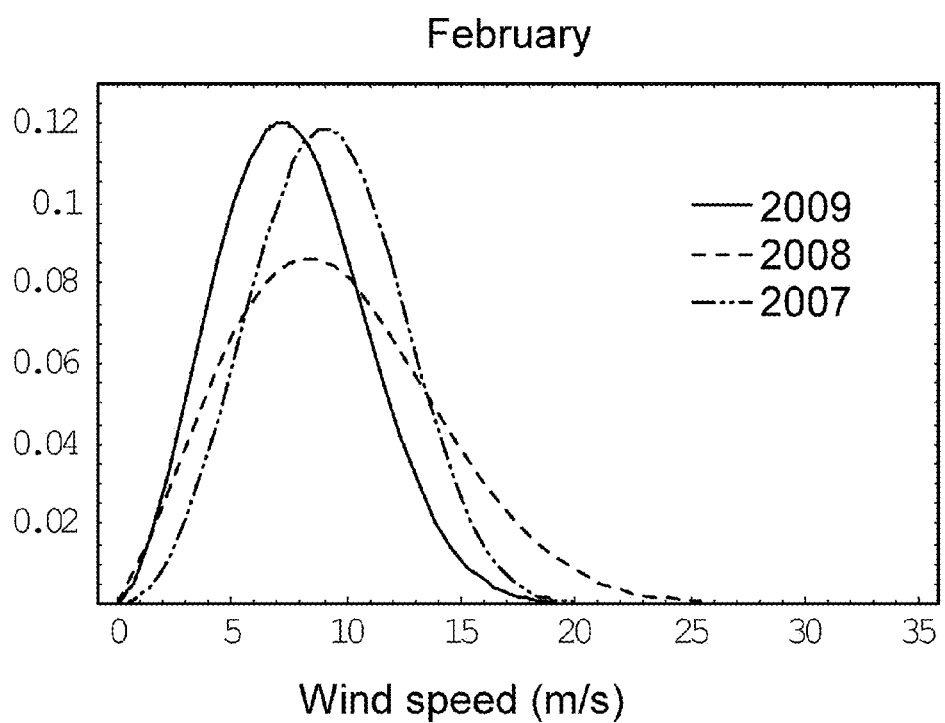

FIGS. 4a and 4b show wind distribution curves for a specific site during January (FIG. 4a) and February (FIG. 4b), respectively, for three subsequent years, i.e., 2007, 2008 and 2009. From FIG. 4a, it appears that the average wind speed in January 2007 and the average wind speed in January 2008 were almost identical. However, the standard deviation for the wind speed in January 2007 was somewhat larger than the standard deviation for the wind speed in January 2008. The average wind speed in January 2009 was somewhat lower than the average wind speed in January 2007 and 2008.

From FIG. 4b, it appears that the average wind speed in February 2007, 2008 and 2009 was very similar, the average wind speed in February 2009 being slightly lower than the two preceding years. The standard deviation of the wind speed in February 2008 is somewhat larger than the standard deviation of the wind speed in February 2007 and in February 2009.

Comparing FIGS. 4a and 4b, it seems that the average wind speed in January is generally higher than the average wind speed in February. Thus, higher wind speeds may generally be expected during January than during February. Using all the wind speed measurements performed in 2007, 2008, and 2009, and preferably measurements performed during many other years, a good statistical material is provided, which can be used for estimating or predicting the expected wind speed at the site during the next month. As described above, this may be used when determining whether the wind turbine should be operated in a derated state in order to adjust the expected remaining lifetime to a desired remaining lifetime. For instance, in the case that the empirically obtained statistical wind data for the site of the wind turbine indicates that a relatively high wind speed is likely to occur during the next one or more months, then it may be concluded that a maximum power production of the wind turbine will most likely result in high wear on a component given rise to an alarm. Under these circumstances, it may be necessary to operate the wind turbine in a derated state in order to obtain a sufficiently long expected remaining lifetime for the component. On the other hand, if the expected wind speed in the next one or more months are expected to be relatively low, then it may not be necessary to operate the wind turbine in a derated state.

Figure 5A:
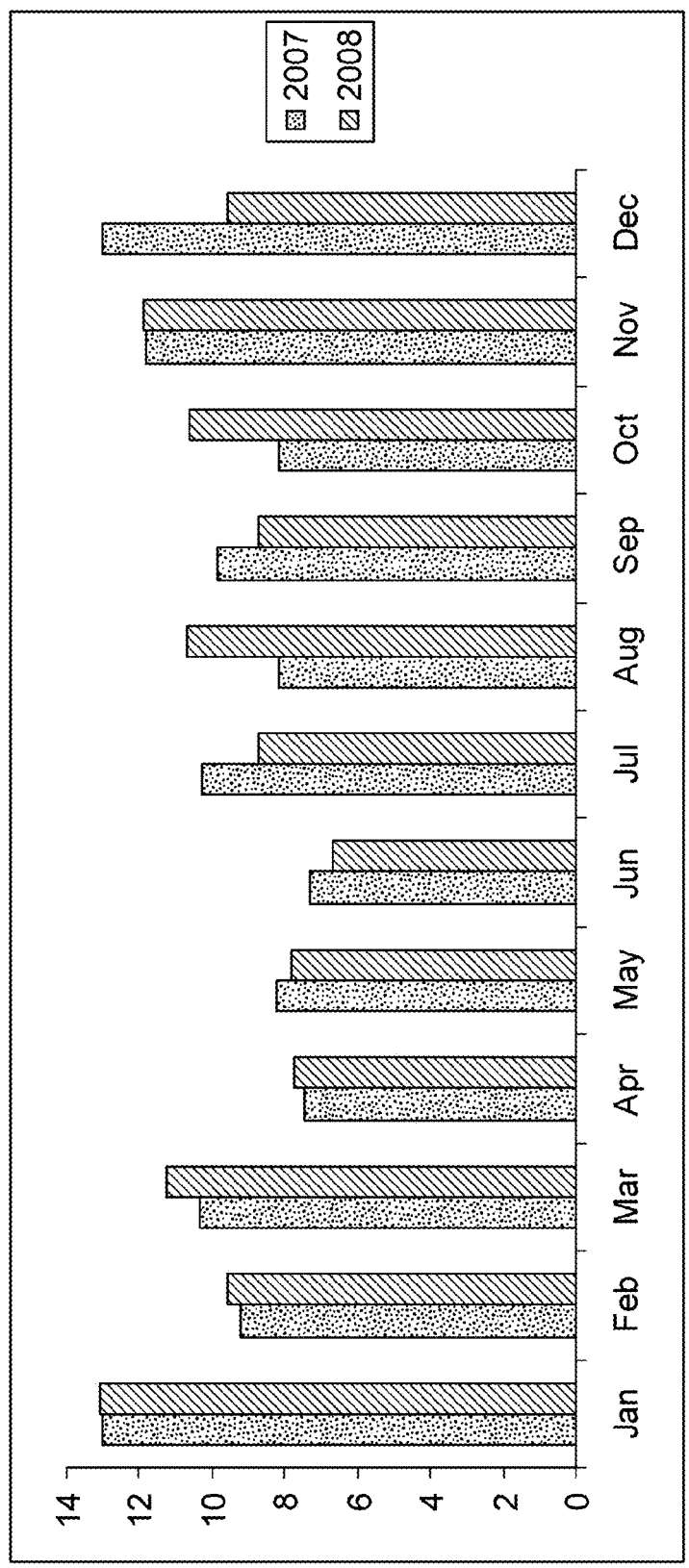
FIG. 5a shows monthly average wind speeds for a specific site for two subsequent years.
Figure 5B:
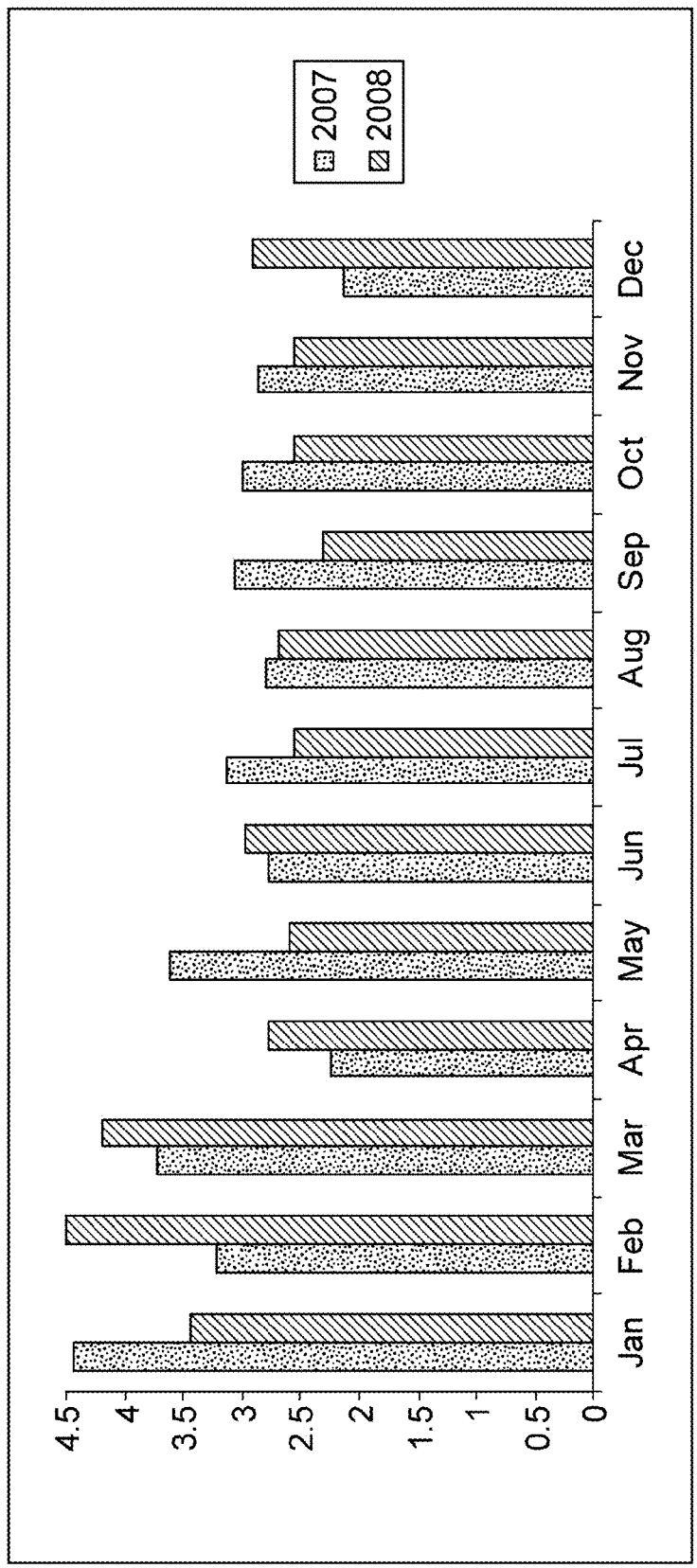
FIG. 5b shows monthly standard deviation of wind speeds for a specific site for two subsequent years.

FIG. 5a shows monthly average wind speeds for a specific site for two subsequent years, i.e., 2007 and 2008, and FIG. 5b shows monthly standard deviation of wind speeds for the site for 2007 and 2008. FIG. 5a shows a clear trend towards higher wind speeds during the winter season and lower wind speeds during the summer season. The diagrams of FIGS. 5a and 5b have been obtained from curves of the kind shown in FIGS. 4a and 4b. As explained above, the empirical wind data obtained in this manner can be used when determining whether the wind turbine should be operated in a derated state in order to obtain a desired expected remaining lifetime for a component giving rise to an alarm.

Figure 6:
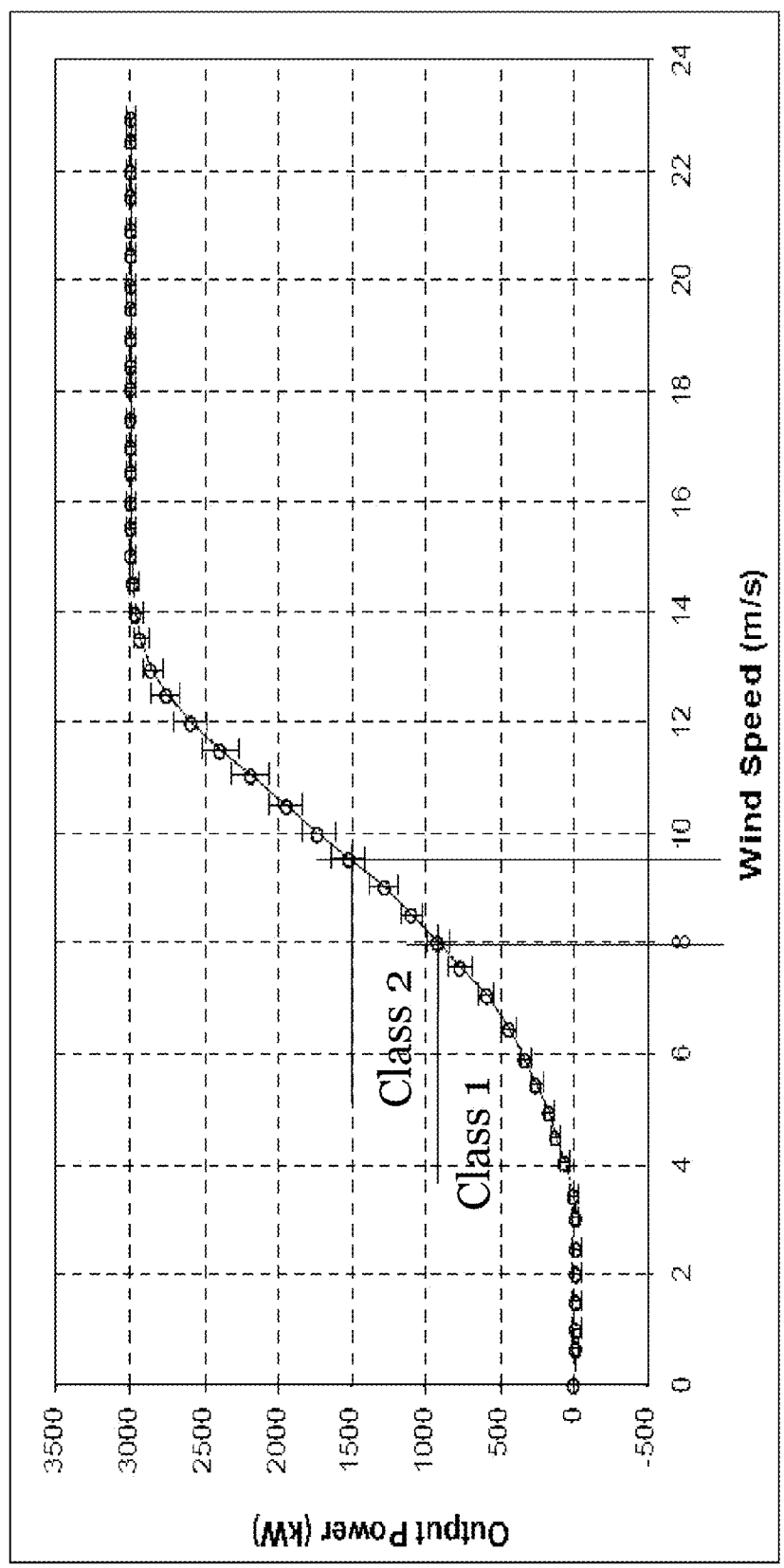
FIG. 6 is an output power curve for a wind turbine according to an embodiment of the invention.

FIG. 6 is an output power curve for a wind turbine according to an embodiment of the invention. The wind turbine has a nominal power of 3 MW. At low wind speeds, the power production is zero. At the cut-in wind speed, about 4 m/s, the wind turbine starts to produce power in power class 1. As the wind speed increases, the power production is also increased, until the nominal power, 3 MW, is reached at a wind speed about 14 m/s. At higher wind speeds the output power is restricted to the nominal power. Power intervals corresponding to power output class 1 and power output class 2 are marked. The output power curve of FIG. 6 is merely included in order to illustrate the concept of power output classes.

Figure 7:
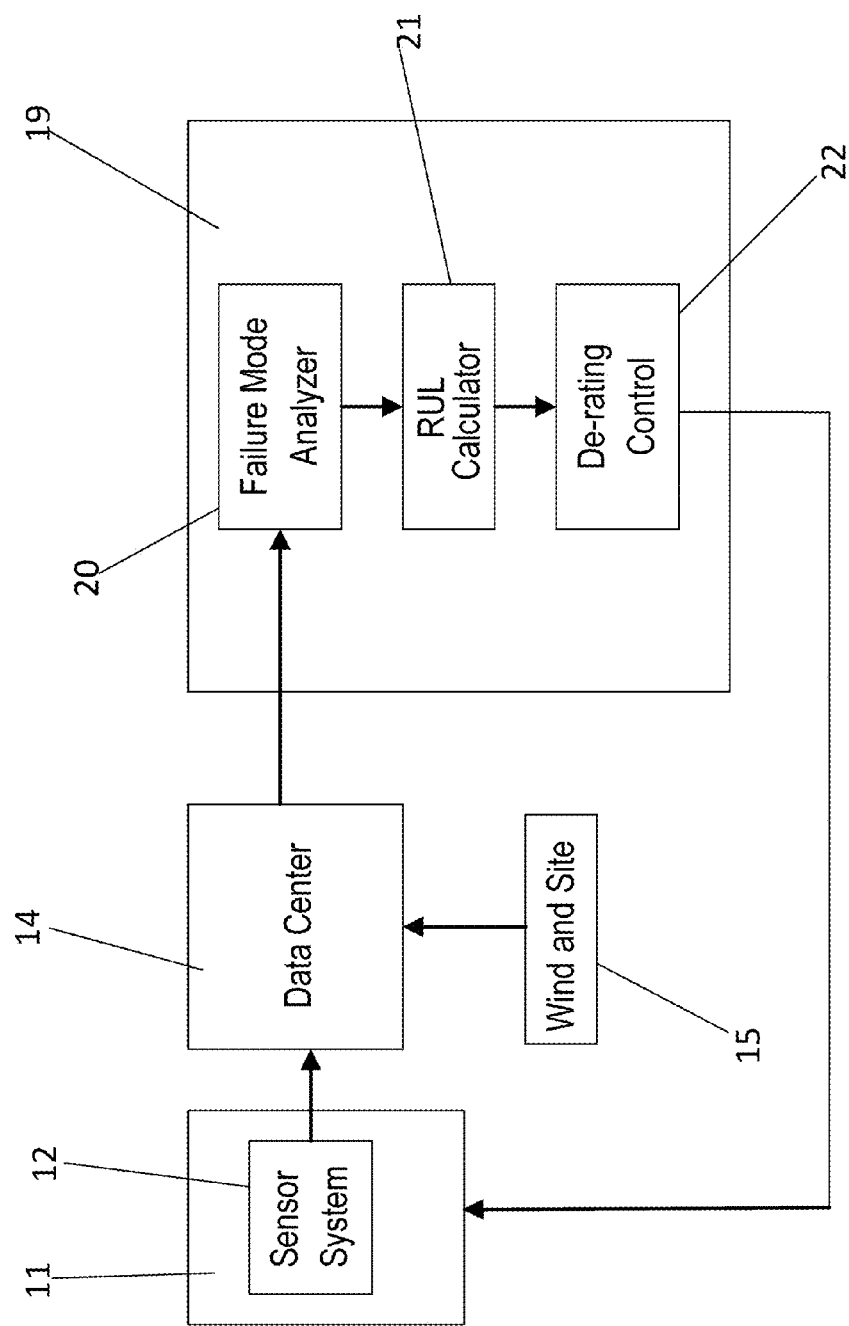
FIG. 7 is a diagram illustrating a system according to an embodiment of the invention.

FIG. 7 is a diagram illustrating a system according to an embodiment of the invention. In a wind turbine 11, a sensor system 12 obtains data relating to the health status of one or more components of the wind turbine 11. The sensor system 12 may, e.g., be or comprise the sensors illustrated in FIGS. 1a-1c. The sensor signals from the sensor system 12 are transferred to a data center 14. The data center 14 may also receive additional information, such as information regarding wind and site 15. The data center 14 processes the received input and feeds a signal to a condition based operation (CBO) system terminal 19. In the CBO system terminal 19, a failure mode analyser 20 analyses the input received from the data center 14. Based on the analysis, an alarm level is determined for one or more components of the wind turbine 11. Next, the expected remaining lifetime for one or more components is calculated by a remaining useful lifetime (RUL) calculator 21.

If it turns out that the expected remaining lifetime for at least one component is shorter than the time to the next scheduled service event for the wind turbine 11, or the time to the next low wind period, then the operation of the wind turbine 11 may be derated, e.g., as described above, by means of a derating control 22.

Figure 8:
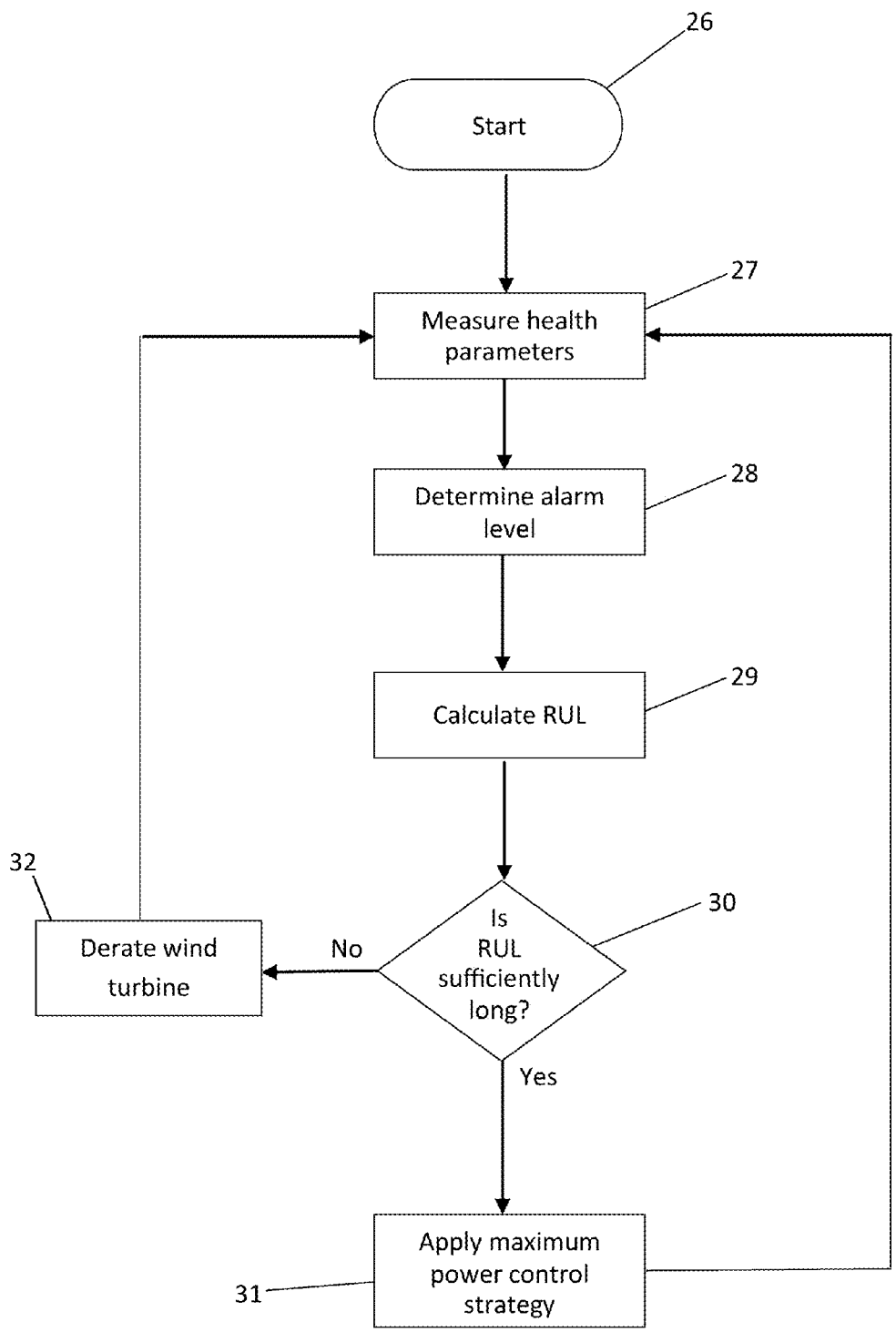
FIG. 8 is a flow chart illustrating a method according to an embodiment of the invention.

FIG. 8 is a flow chart illustrating a method according to an embodiment of the invention. The process is started in step 26. In step 27, health parameters for one or more components are measured, e.g., by means of sensors arranged at or near the relevant component(s). Based on the measured parameters, an alarm level for at least one of the components is determined at step 28. Based on the alarm level, and possibly on additional information, such as empirically obtained data about the wind and site and/or about the behaviour of the component, the expected remaining useful lifetime (RUL) for the component is calculated in step 29. In step 30, it is investigated whether or not the calculated RUL is sufficiently long to allow the wind turbine to operate until the next scheduled service event. If this is the case, the wind turbine is operated according to a maximum power output control strategy, as indicated in step 31. Subsequently, the process is returned to step 27, where health parameters for one or more components are once again measured.

In the case that step 30 reveals that the calculated RUL is insufficient to allow the wind turbine to operate until the next scheduled service event, then the wind turbine is operated in a derated state, as indicated in step 32. Subsequently, the process is returned to step 27, where health parameters for one or more components are once again measured. The derating may, e.g., be performed by adjusting the time which the wind turbine is operated in the various power output classes in such a manner that, at least for some of the remaining lifetime, the wind turbine is operated at a power output class which is lower than the highest possible power output class which could be selected under the given circumstances. The derating may advantageously be performed as described above with reference to FIG. 2 or FIG. 3.

Figure 9:
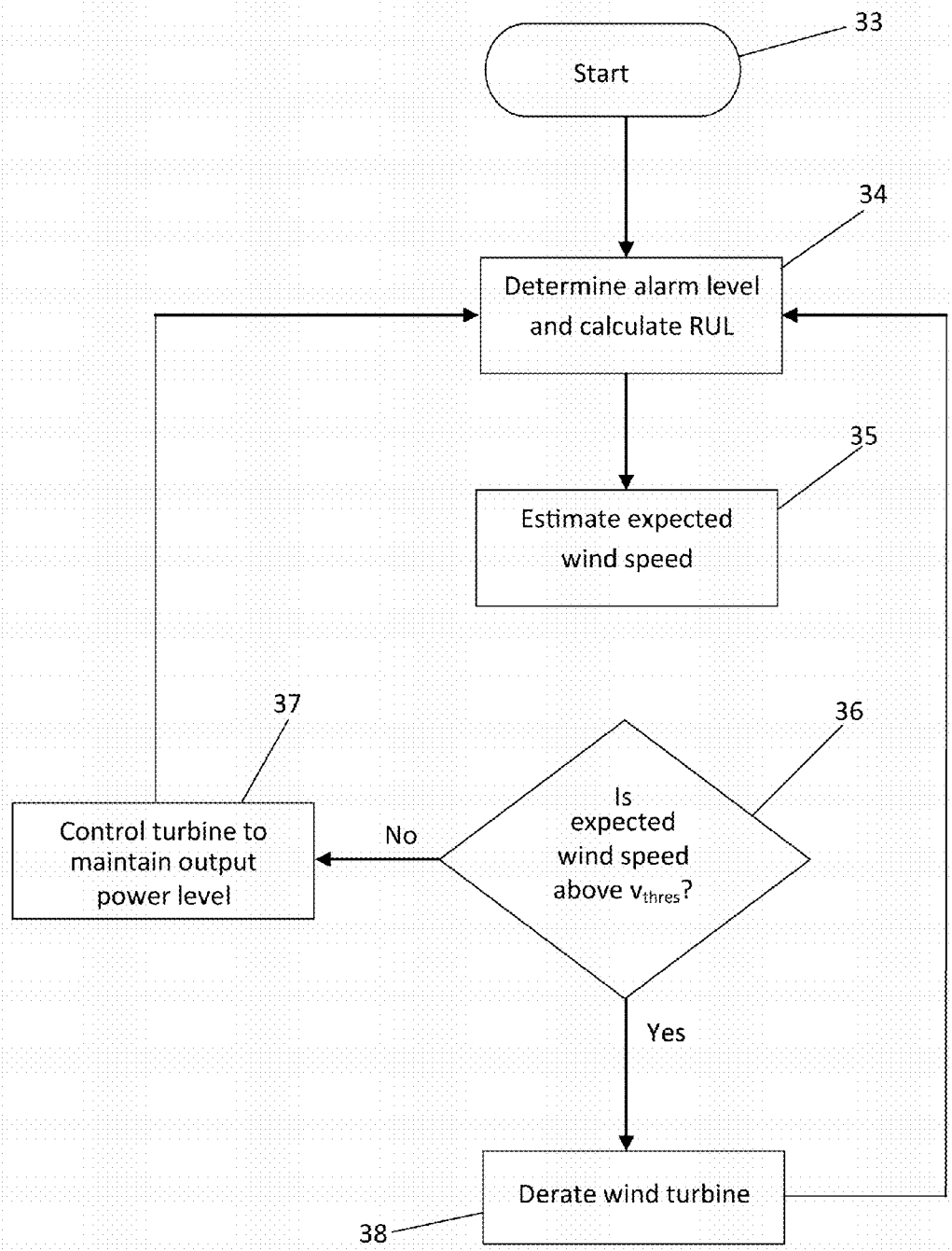
FIG. 9 is a flow chart illustrating a method according to an alternative embodiment of the invention.

FIG. 9 is a flow chart illustrating a method according to an alternative embodiment of the invention. The process is started in step 33. In step 34, an alarm level for at least one component of the wind turbine is determined, and the remaining useful lifetime (RUL) for the component is calculated. The alarm level may, e.g., be determined on the basis of measured health parameters as described above.

In step 35, an expected wind speed within an immediate future period of time is estimated. The period of time may advantageously be substantially the RUL which was calculated in step 34. The expected wind speed may be estimated on the basis of empirical wind data, such as wind data of the kind illustrated in FIGS. 4a-5b. Thus, when the time of year is known, the expected wind speed within the next month or within the next couple of months can be estimated, based on the empirically obtained and statistically processed wind data for the site, which are relevant for the specific time of year.

In step 36, the expected wind speed which was estimated in step 35 is compared to a threshold wind speed, $v_{thres}$. In the case that the expected wind speed is below the threshold value, it is determined that derating of the wind turbine is not necessary in order to obtain a desired RUL. Accordingly, the wind turbine is operated in such a manner that an output power level is maintained, preferably in such a manner that a maximum possible power output is achieved, in step 37. Subsequently, the process is returned to step 34, where an alarm level is once again determined.

On the other hand, if the expected wind speed is above the threshold value, then it is determined that the wind speed is expected to be so high that the RUL is affected if the wind turbine is not derated. Accordingly, the wind turbine is derated in step 38. Subsequently, the process is returned to step 34, where an alarm level is once again determined. Similarly to the situation described above with reference to FIG. 8, the derating may advantageously be performed as described with reference to FIG. 2 or FIG. 3.

The sensor system 12, the data center 14, and/or the CBO system terminal 19 may include at least one processor coupled to a memory. The memory may represent the random access memory (RAM) devices constituting the main storage of each processor and any cache memories, non-volatile or backup memories (e.g., programmable or flash memories), read-only memories, etc. The sensor system 12, the data center 14, and/or the CBO system terminal 19 may also include one or more mass storage devices as understood by a person of ordinary skill in the art. The sensor system 12, the data center 14, and/or the CBO system terminal 19 also typically receive a number of inputs and outputs for communicating information externally. For interfacing with a user or operator, the sensor system 12, the data center 14, and/or the CBO system terminal 19 may include a graphical user interface with one or more input devices, such as a keyboard, a mouse, a trackball, a joystick, a touchpad, a keypad, a stylus, and/or a microphone, among others, as well a display, such as a CRT monitor, an LCD display panel, and/or a speaker, among others, or other type of output device, such as a printer. The interface to the sensor system 12, the data center 14, and/or the CBO system terminal 19 may also be directed through an external terminal connected directly or remotely to sensor system 12, the data center 14, and/or the CBO system terminal 19, or through another computer communicating with sensor system 12, the data center 14, and/or the CBO system terminal 19 via a network or other type of recognized communications device.

The sensor system 12, the data center 14, and/or the CBO system terminal 19 generally operate under the control of an operating system, and execute or otherwise rely upon various computer software applications, components, programs, objects, modules, data structures, etc. In particular, the CBO system terminal 19 may execute a software application, component, program, object, module, or data structure embodying the failure mode analyser 20, the RUL calculator 21, and the de-rating control 22 such that the methods for controlling operation of a wind turbine described herein (e.g., the embodiments of FIGS. 8 and 9) are implemented and, in particular, the methods described herein that minimize downtime of a wind turbine due to breakdown of components and/or required unscheduled service events are implemented. In general, the routines executed to implement the embodiments of the invention, whether implemented as part of an operating system or a specific application, component, program, object, module, or data structure will be referred to herein as "computer program code", or simply "program code". The computer program code typically comprises a sequence of instructions that is resident at various times in various memory and mass storage devices in a computer, and that, when read and executed by one or more processors in a computer, causes that computer to perform the steps necessary to execute steps or elements embodying the various aspects of the embodiments of the invention.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

The invention claimed is:

1. A method of controlling the operation of a wind turbine, the method comprising the steps of:
    determining an alarm level for at least one component of the wind turbine; and
    in the case that an alarm level for at least one component exceeds a predefined level:
    estimating an expected remaining lifetime for said component under the current operating conditions, and
    controlling operation of the wind turbine in order to adjust the expected remaining lifetime for said component to a desired expected remaining lifetime for said component,
    wherein the step of controlling operation of the wind turbine comprises the steps of:
    estimating an expected wind speed at the site of the wind turbine during the estimated expected remaining lifetime of said component; and
    if the estimated expected wind speed is below a predefined threshold value, controlling operation of the wind turbine to maintain an output power level of the wind turbine.

2. The method of claim 1, wherein the step of determining the alarm level for at least one component of the wind turbine comprises the steps of:
    obtaining data relating to health status for one or more components of the wind turbine; and
    determining an alarm level for at least one of the component based on the obtained data.

3. The method of claim 2, wherein the step of obtaining data relating to the health status for one or more components comprises:
    measuring one or more parameters of each component by means of one or more sensors.

4. The method of claim 1, wherein the step of estimating an expected remaining lifetime for said component is performed on the basis of empirically obtained data.

5. The method of claim 4, wherein the empirically obtained data comprises data relating to wind speed or wind direction at the site of the wind turbine.

6. The method of claim 4, wherein the empirically obtained data comprises data relating to lifetimes of components identical or similar to said component(s).

7. The method of claim 1, wherein step of controlling the wind turbine comprises:
    reducing the power production of the wind turbine in order to extend the expected remaining lifetime of said component to a coming scheduled maintenance of the wind turbine.

8. The method of claim 1, wherein the step of estimating an expected wind speed is performed on the basis of empirically obtained wind data.

9. A method of controlling the operation of a wind turbine, the method comprising the steps of:
    determining an alarm level for at least one component of the wind turbine; and
    in the case that an alarm level for at least one component exceeds a predefined level:
    estimating an expected remaining lifetime for said component under the current operating conditions, and
    controlling operation of the wind turbine in order to adjust the expected remaining lifetime for said component to a desired expected remaining lifetime for said component,
    wherein the step of controlling operation of the wind turbine comprises the steps of:
    estimating an expected wind speed at the site of the wind turbine during the estimated expected remaining lifetime of said component; and
    if the estimated expected wind speed is above the predefined threshold value, controlling operation of the wind turbine to reduce the output power level of the wind turbine.

10. The method of claim 9, further comprising the step of:
scheduling maintenance of the wind turbine in the case that the alarm level for the component remains above the predefined level after the output power level of the wind turbine has been reduced.

11. The method of claim 9, wherein the step of estimating an expected wind speed is performed on the basis of empirically obtained wind data.

12. The method of claim 9, wherein the step of determining the alarm level for at least one component of the wind turbine comprises the steps of:
obtaining data relating to health status for one or more components of the wind turbine; and
determining an alarm level for at least one of the component based on the obtained data.

13. The method of claim 12, wherein the step of obtaining data relating to the health status for one or more components comprises:
measuring one or more parameters of each component by means of one or more sensors.

14. The method of claim 9, wherein the step of estimating an expected remaining lifetime for said component is performed on the basis of empirically obtained data.

15. The method of claim 14, wherein the empirically obtained data comprises data relating to wind speed or wind direction at the site of the wind turbine.

16. The method of claim 14, wherein the empirically obtained data comprises data relating to lifetimes of components identical or similar to said component(s).

17. The method of claim 9, wherein step of controlling the wind turbine comprises:
reducing the power production of the wind turbine in order to extend the expected remaining lifetime of said component to a coming scheduled maintenance of the wind turbine.

* * * * *